United States Patent
Hsiao et al.

(10) Patent No.: US 9,244,509 B2
(45) Date of Patent: Jan. 26, 2016

(54) UNINTERRUPTIBLE POWER SYSTEM AND POWER CONTROL SYSTEM THEREOF

(71) Applicant: Wistron Corporation, New Taipei (TW)

(72) Inventors: Jen-Pin Hsiao, New Taipei (TW); Tung-Sheng Yeh, New Taipei (TW); Ho-Yuan Chu, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 197 days.

(21) Appl. No.: 13/949,057

(22) Filed: Jul. 23, 2013

(65) Prior Publication Data

US 2014/0101464 A1    Apr. 10, 2014

(30) Foreign Application Priority Data

Oct. 4, 2012    (TW) .............................. 101136724 A (51) Int. Cl.
*G06F 1/26*    (2006.01)
*G06F 1/30*    (2006.01)

(52) U.S. Cl.
CPC . *G06F 1/263* (2013.01); *G06F 1/30* (2013.01)

(58) Field of Classification Search
CPC .................................. G06F 1/30; G06F 1/263
See application file for complete search history.

(56) References Cited

U.S. PATENT DOCUMENTS

| | | | |
|---|---|---|---|
| 4,868,832 A | 9/1989 | Marrington et al. | |
| 5,317,752 A * | 5/1994 | Jewett et al. | 714/14 |
| 5,809,311 A * | 9/1998 | Jones | 713/300 |
| 6,275,946 B1 * | 8/2001 | Meir | 713/300 |
| 7,525,218 B2 * | 4/2009 | Togashi | 307/65 |
| 8,239,696 B2 * | 8/2012 | Zhao | 713/300 |
| 9,116,682 B2 | 8/2015 | Uehara | |
| 2010/0164290 A1 | 7/2010 | Chiang | |
| 2013/0198537 A1 * | 8/2013 | Uehara | 713/300 |

FOREIGN PATENT DOCUMENTS

| | | |
|---|---|---|
| CN | 201904609 U | 7/2011 |
| WO | WO 2012/039049 A1 | 3/2012 |

OTHER PUBLICATIONS

Taiwanese Office Action dated Aug. 13, 2014, as issued in corresponding Taiwan Patent Application No. 101136724 (with English translation of pp. 2-5 as marked in the Office Action.

* cited by examiner

*Primary Examiner* — M Elamin
(74) *Attorney, Agent, or Firm* — Muncy, Geissler, Olds & Lowe, P.C.

(57) ABSTRACT

An uninterruptible power system and a power control system thereof are disclosed. The power control system includes the uninterruptible power system and a computer system. The uninterruptible power system supplies power to the computer system and includes an external power adaptor, a battery module, a first switch module, a second switch module, and a switching control module. When external power is input, the external power is transmitted to the computer system via the external power adaptor. When the external power is not input, the first switch module switches automatically to supply a backup power signal from the battery module to the computer system. When the external power is not input and a control signal is not received from the computer system, the switching control module controls the second switch module to electrically disconnect a connection between the computer system and the battery module.

12 Claims, 5 Drawing Sheets

| Controlling state | Control signal level | Power signal | Second switch module |
|---|---|---|---|
| First controlling state | Low/High | 19.5V | Connection |
| Second controlling state | High | 0V | Connection |
| Third controlling state | Low | 0V | Disconnection |

Fig. 4

UNINTERRUPTIBLE POWER SYSTEM AND POWER CONTROL SYSTEM THEREOF

BACKGROUND OF THE INVENTION

1. Field of the Invention

The present invention is related to an uninterruptible power system and a power control system thereof; more particularly, it is related to an uninterruptible power system and a power control system thereof that can save the power consumption of a battery module.

2. Description of the Related Art

With the development of modern technology, computer systems have been widely applied in various kinds of conditions. A computer system needs to receive a power signal stably and operate for a long time to maintain normal execution and prevent damage to the computer system. Therefore, an uninterruptible power system can be disposed in a computer system for allowing the computer system to maintain normal execution over a period time by drawing power from a battery module of the uninterruptible power system when the power fails. However, the capacity of the battery module of the uninterruptible power system is limited. The computer system cannot depend on the power of the battery module endlessly. Furthermore, in the prior art, the computer system cannot automatically break the connection with the uninterruptible power system. The computer system can only be shut down by a user manually; otherwise, the computer system will draw power from the battery module continuously until the battery module is exhausted. Should that occur, the computer system would be shut down suddenly, and damage to the computer system might occur. In addition, if the power of the battery module is consumed continuously, the resulting overdischarge effect can reduce the life of the battery module.

Therefore, there is a need for a new uninterruptible power system and a power control system thereof that can solve the problems of the prior art.

SUMMARY OF THE INVENTION

A major objective of the present invention is to provide an uninterruptible power system that is able to save the power of a battery module.

Another major objective of the present invention is to provide a power control system with the abovementioned uninterruptible power system.

To achieve the above objectives, the uninterruptible power system of the present invention is connected to a power supply terminal for providing power to a computer system. The uninterruptible power system comprises an external power port, a charging module, a battery module, a first switch module, a second switch module, and a switching control module. The external power port is electrically connected to the power supply terminal for receiving an external power signal. The charging module is electrically connected to the external power port for receiving the external power signal from the external power port. The battery module is used for providing a backup power signal and is electrically connected to the charging module, wherein the charging module charges the battery module with the external power signal. The first switch module is electrically connected to the external power port, the battery module, and the computer system, wherein when the external power signal is input, the external power signal is transmitted from the external power port to the computer system via the first switch module; when the external power signal is not input, the first switch module switches automatically to enable the battery module to be electrically connected to the computer system for providing the backup power signal to the computer system. The second switch module is electrically connected to the computer system and connected to the external power port or the battery module via the first switch module. The switching control module is electrically connected to the external power port, the computer system, and the second switch module, wherein when the external power signal is not input and a control signal is not received from the computer system, the switching control module controls the second switch module to electrically disconnect a connection between the computer system and the battery module.

The power control system of the present invention is connected to a power supply terminal. The power control system comprises a computer system and an uninterruptible power system. The uninterruptible power system is electrically connected and provides power to the computer system. The uninterruptible power system comprises an external power port, a charging module, a battery module, a first switch module, a second switch module, and a switching control module. The external power port is electrically connected to the power supply terminal for receiving an external power signal. The charging module is electrically connected to the external power port for receiving the external power signal from the external power port. The battery module is used for providing a backup power signal and is electrically connected to the charging module, wherein the charging module charges the battery module with the external power signal. The first switch module is electrically connected to the external power port, the battery module, and the computer system, wherein when the external power signal is input, the external power signal is transmitted from the external power port to the computer system via the first switch module; when the external power signal is not input, the first switch module switches automatically to activate the battery module electrically connected to the computer system for providing the backup power signal to the computer system. The second switch module is electrically connected to the computer system d connected to the external power port or the battery module via the first switch module. The switching control module is electrically connected to the external power port, the computer system, and the second switch module, wherein when the external power signal is not input and a control signal is not received from the computer system, the switching control module will control the second switch module to electrically disconnect a connection between the computer system and the battery module.

DETAILED DESCRIPTION OF THE PREFERRED EMBODIMENTS

The aforementioned and other objectives, features, and advantages of the present invention will become more apparent from the following detailed description when taken in conjunction with the accompanying drawings.

Figure 1A:
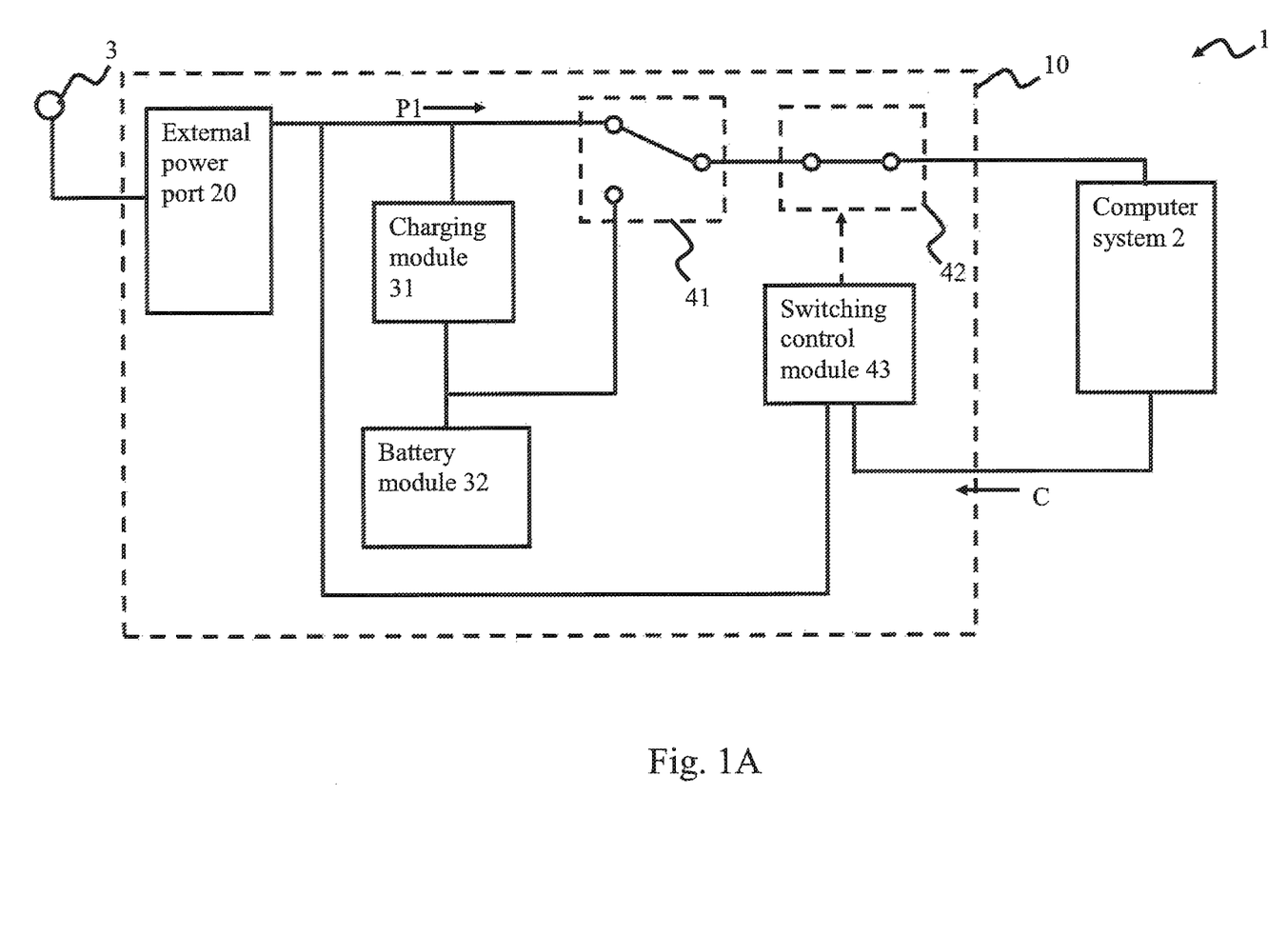
FIG. 1A is a structure diagram illustrating a first controlling state of a power control system and an uninterruptible power system of the present invention.

Please refer to FIG. 1A, which is a structure diagram illustrating a first controlling state of a power control system and an uninterruptible power system of the present invention.

Figure 2:
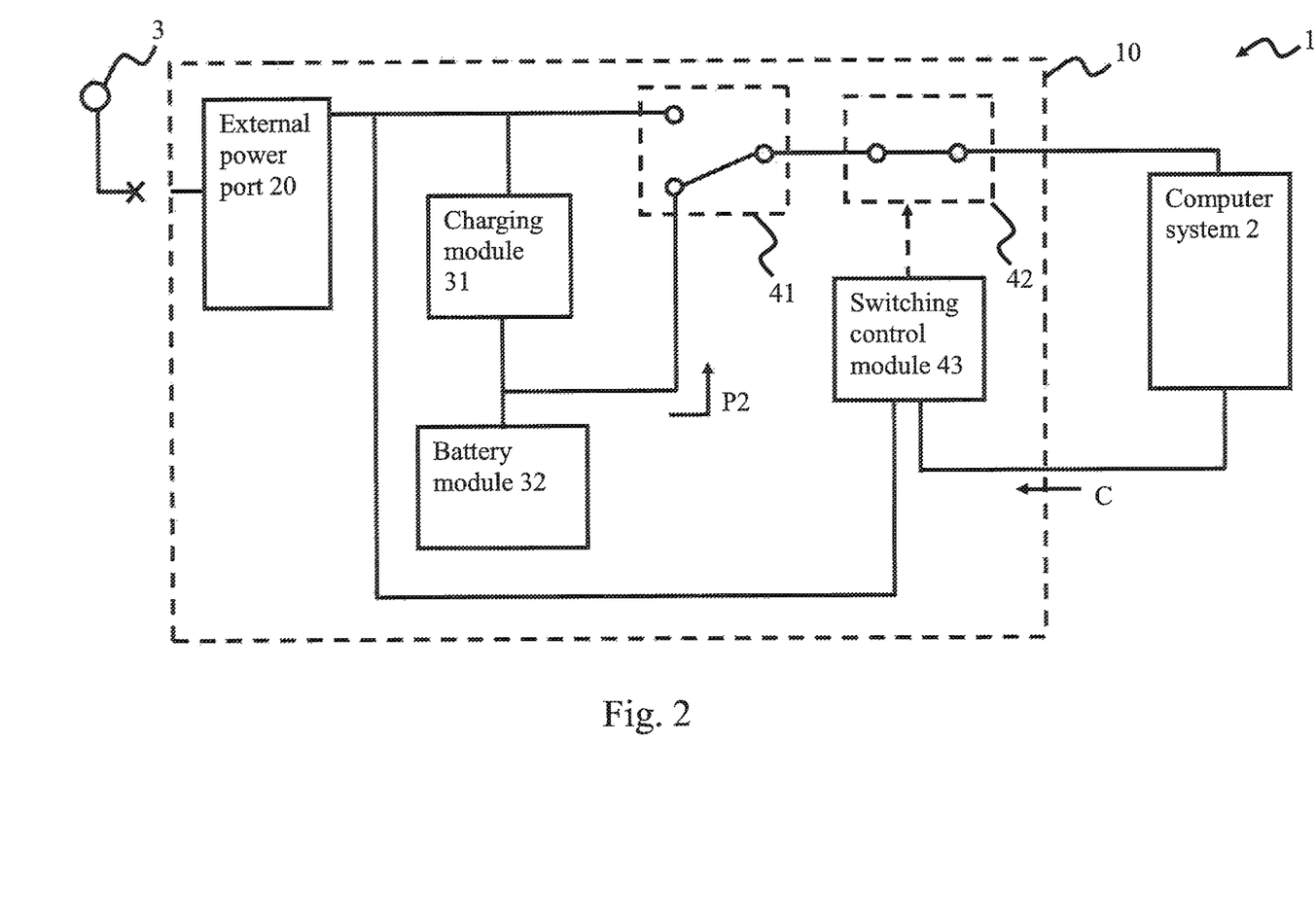
FIG. 2 is a structure diagram illustrating a second controlling state of the power control system and the uninterruptible power system of the present invention.

The power control system 1 of the present invention comprises an uninterruptible power system 10 and a computer system 2. The power control system 1 is electrically connected to the power supply terminal 3. The uninterruptible power system 10 is disposed in the power control system 1 and connected to the power supply terminal 3 for providing power to the computer system 2. The power might comprise an external power signal P1 outputted from the power supply terminal 3 or a backup power signal P2 (as shown in FIG. 2) drawn from the uninterruptible power system 10. The computer system 2 is comprises a motherboard, a central processor unit, a storage device, and an interface card that needs to receive a power signal for activating, such as a desktop computer, a packaged computer, a server computer, or a laptop computer, but the present invention is not limited to only such applications.

The uninterruptible power system 10 comprises an external power port 20, a charging module 31, a battery module 32, a first switch itch module 41, a second switch module 42, and a switching control module 43. The external power port 20 is electrically connected to the power supply terminal 3 for receiving an external power signal P1 supplied by the power supply terminal 3. The power supply terminal 3 can be equipment for providing an AC signal, such as mains electricity or a generator. The power supply terminal 3 can also be equipment for providing a DC signal, such as a battery. The present invention is not limited to the type of the external power signal P1. Different circuits may also be disposed in the external power port 20 based on varying requirements. For example, an AC-DC converter module can be disposed for converting an AC external power signal P1 into a DC external power signal P1 and then providing the DC signal to other modules.

The charging module 31 is electrically connected to the external power port 20 for receiving an external power signal P1 from the external power port 20. The battery module 32 may be a lead-acid battery, but the present invention is not limited to only the example mentioned above. The battery module 32 is electrically connected to the charging module 31. After the charging module 31 receives the external power signal P1, the charging module 31 charges the battery module 32 to increase a capacity of the backup power signal P2 of the battery module 32. The first switch module 41 can be a metal-oxide-semiconductor field-effect transistor (MOSFET) and is electrically connected to the external power port 20, the battery module 32, and the computer system 2. When the external power signal P1 is continuously input from the external power port 20, the first switch module 41 maintains the connection between the external power port 20 and the computer system 2 for transmitting the external power signal P1 to the computer system 2. If the external power signal P1 cannot be input from the external power port 20, the first switch module 41 is switched to electrically connect the battery module 32 and the computer system 2 (as illustrated in FIG. 2) by the controlling of the battery module 32 or other module of the uninterruptible power system 10. The other module of the uninterruptible power system 10 may be a switching control module 43 or other module not shown in FIG. 1, but the present invention is not limited to only the examples mentioned above. As a result, the battery module 32 is able to supply the backup power signal P2 to the computer system 2. Since the operations and functions of the external power port 20, the charging module 31, the battery module 32, and the first switch module 41 are well known to persons of ordinary skill in the art, they are not further explained here.

The second switch module 42 can also be a MOSFET. The second switch module 42 is electrically connected to the first switch module 41 and the computer system 2 and able to connect to the external power port 20 or the battery module 32 according to the switching of the first switch module 41. Therefore, when the external power port 20 transmits the external power signal P1 or the battery module 32 supplies the backup power signal P2, the external power signal P1 or the backup power signal P2 must pass through the second switch module 42 first before being transmitted to the computer system 2.

The switching control module 43 is electrically connected to the second switch module 42, the external power port 20, and the computer system 2 for controlling the turn-on or the cut-off of the second switch module 42 according to the external power signal P1 of the external power port 20 and the control signal C of the computer system 2.

Therefore, the switching control module 43 is used for determining whether the computer system 2 is able to receive the external power signal P1 or the backup power signal P2 continuously. The control signal C is a level signal generated by the computer system 2 for controlling the switching control module 43. The computer system 2 is able to generate the control signal C when the computer system 2 is on or when the backup procedure is to be executed. Therefore, whether the computer system 2 generates the control signal C or not, the switching control module 43 can control the second switch module 42 to maintain the connection when the switching control module 43 receives the external power signal P1 of the external power port 20.

Figure 1B:
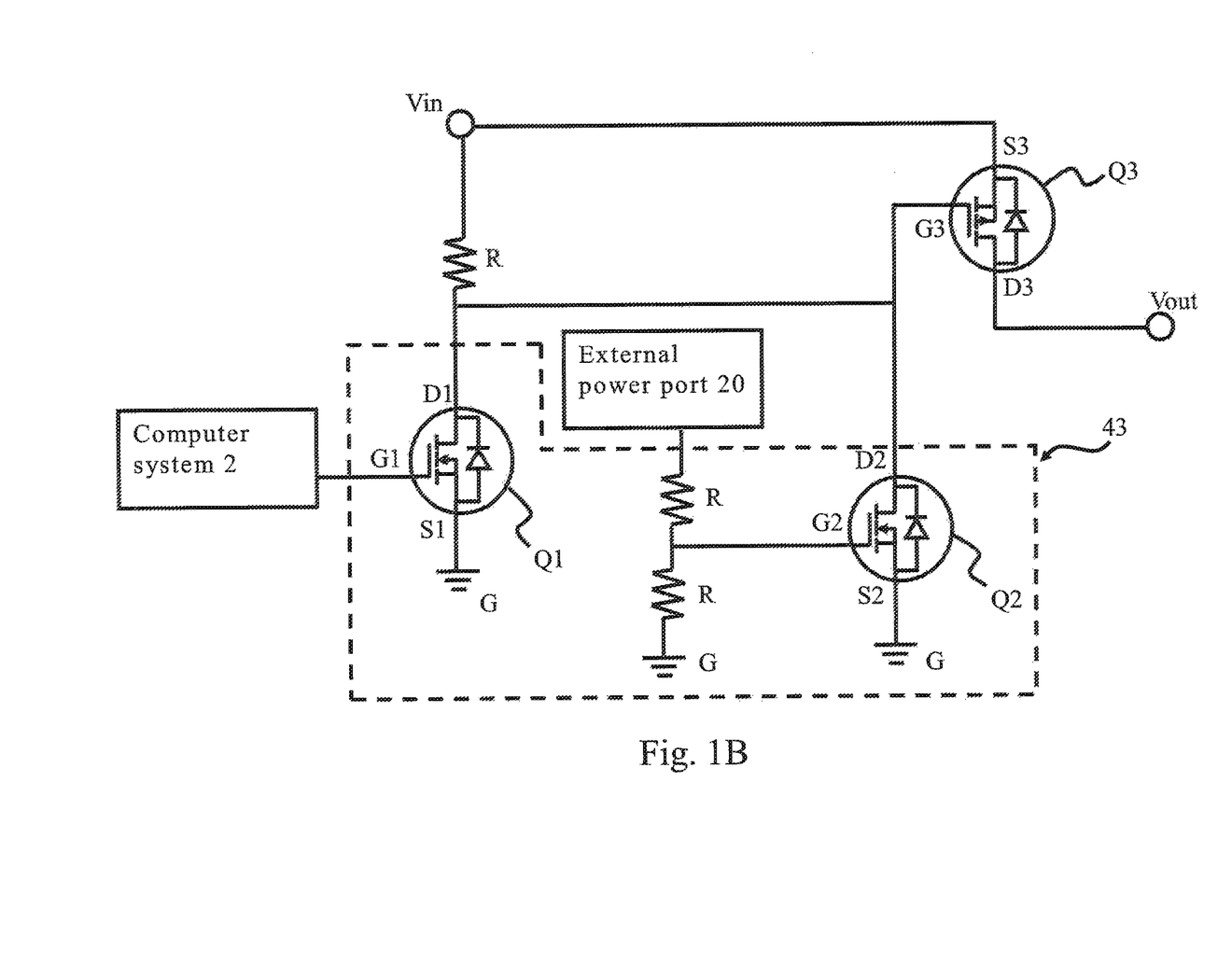
FIG. 1B is a circuit structure diagram illustrating a switching control module and a second switch module of the present invention.

Please refer to FIG. 1B, which is a circuit structure diagram illustrating a switching control module and a second switch module of the present invention. Please note that FIG. 1B only shows one embodiment of the present invention and that the second switch module 42 and the switching control module 43 are not limited to the present circuit illustrated in FIG. 1B.

The switching control module 43 comprises a first transistor Q1 and a second transistor Q2, which are N-type metal-oxide-semiconductor field-effect transistors. The second switch module 42 can be a third transistor Q3, which is a P-type metal-oxide-semiconductor field-effect transistor. The drain D1 of the first transistor Q1 is electrically connected to the input terminal yin for receiving the power supplied by the battery module 32, but the present invention is not limited to only the examples mentioned above. The gate G1 of the first transistor Q1 is electrically connected to the computer system 2. The source S1 is electrically connected to the ground end G. As a result, the first transistor Q1 is able to generate a first confirmation signal when the computer system 2 outputs the control signal C. When the computer system 2 stops outputting the control signal C, the first transistor Q1 will not be conducted and the first confirmation signal will not be generated by the first transistor Q1.

The drain D2 of the second transistor Q2 is electrically connected to the input terminal Vin for receiving the power supplied by the battery module 32, but the present invention is not limited to only the examples mentioned above. The gate G2 of the second transistor Q2 is electrically connected to the external power port 20. The source S2 is electrically connected to the ground end G. As a result, the second transistor Q2 is able to generate a second confirmation signal when the external power port 20 transmits the external power signal P1. When the external power port 20 stops outputting the external power signal P1, the second transistor Q2 will not be conducted and the second confirmation signal will not be generated. The source S3 of the third transistor Q3 is electrically connected to the input terminal Vin. The gate G2 of the third transistor Q3 is electrically connected to the drain D1 of the first transistor Q1 and the drain D2 of the second transistor Q2. The drain D3 is electrically connected to the output terminal Vout, which can electrically connect to the computer system 2. Therefore, when the first confirmation signal is received from the first transistor Q1 or the second confirmation signal is received from the second transistor Q2, the third transistor Q3 is able to maintain the connection to enable the power signal input from the input terminal Vin to be output via the output terminal Vout directly. When the third transistor Q3 does not receive the first confirmation signal and the second confirmation signal, the third transistor Q3 electrically disconnects the connection between the input terminal Vin and the output terminal Vout.

Based on the abovementioned circuit, the switching control module 43 is able to control the turn-on or the cut-off of the second switch module 42 according to whether the control signal C or the external power signal P1 is received. Furthermore, the abovementioned elements can be connected to a resistive element R to execute the functions of divide voltage, divide current, limit current, or reduce voltage. Since the operation and function of the resistive element R are well known to persons of ordinary skill in the art, they are not further explained here.

Please refer to FIG. 2, which is a structure diagram illustrating a second controlling state of the power control system and the uninterruptible power system of the present invention.

When the power supply terminal 3 electrically disconnects the external power signal P1 supplied to the external power port 20, the first switch module 41 is switched automatically to connect to the battery module 32 for transmitting the backup power signal P2 to the computer system 2. When the computer system 2 receives the backup power signal P2, the computer system 2 executes the backup procedure automatically for outputting the control signal C to the switching control module 43 at the same time. But the requirement for generating the control signal C from the computer system 2 is not limited to instances when the backup procedure is being executed. The computer system 2 can also output the control signal C whenever the computer system 2 is on. When the switching control module 43 receives the control signal C, the switching control module 43 controls the second switch module 42 to maintain the connection.

Figure 3:
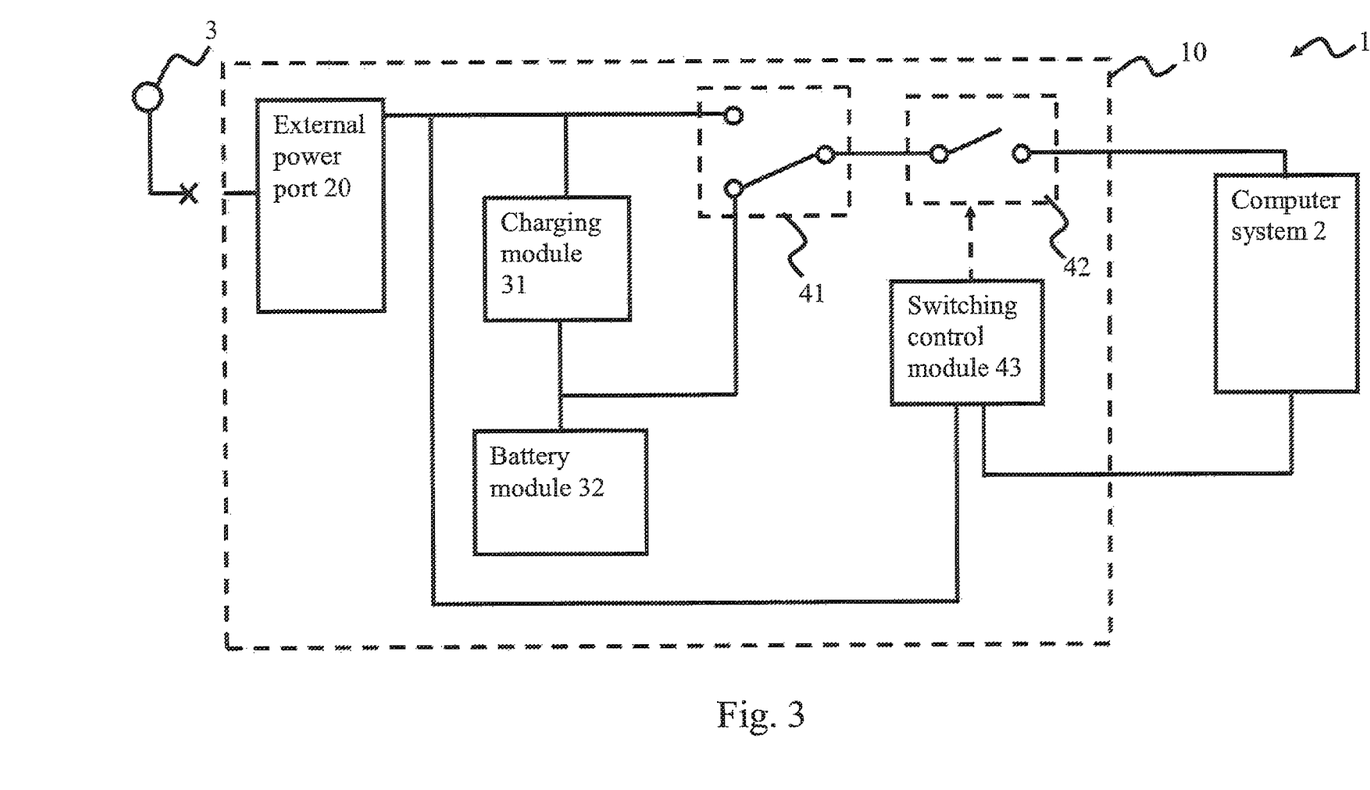
FIG. 3 is a structure diagram illustrating a third controlling state of the power control system and the uninterruptible power system of the present invention.

Please refer to FIG. 3, which is a structure diagram illustrating a third controlling state of the power control system and the uninterruptible power system of the present invention.

After the backup procedure is executed, the computer system 2 will shut down automatically and stop outputting the control signal C to the switching control module 43. Meanwhile, the switching control module 43 will not receive the external power signal P1, nor will the control signal C be received from the computer system 2; the switching control module 43 will control the second switch module 42 to electrically disconnect the electrical connection between the battery module 32 and the computer system 2 so as to prevent the consumption of the backup power signal P2 of the battery module 32.

Figure 4:
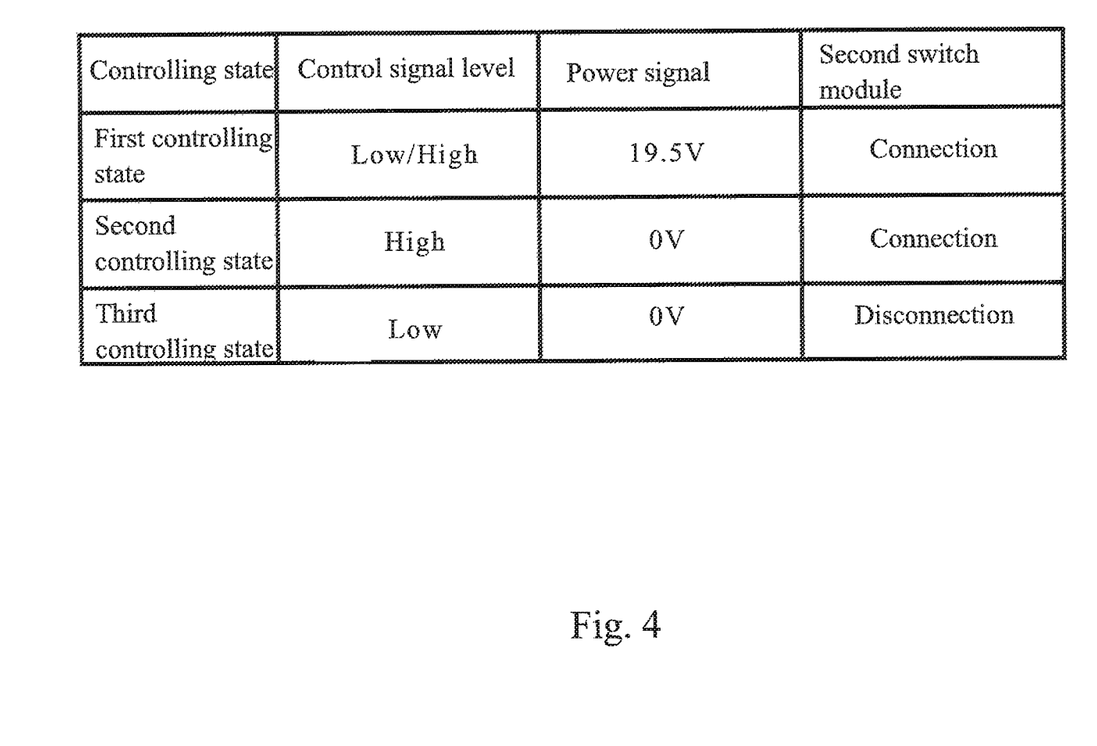
FIG. 4 is a view illustrating the power control system and the uninterruptible power system under a different controlling state of the present invention.

Please refer to FIG. 4, which illustrates the power control system and the uninterruptible power system under the different controlling states of the present invention.

A first controlling state of the present invention is a state in which the external power port 20 is connected to the power supply terminal 3 normally, and the computer system 2 is shutdown. Under the first controlling state, the computer system 2 does not output the control signal C so as to output a low level signal. If the power supply terminal 3 is the mains electricity, the external power signal P1 input from the external power port 20 is 19.5 volts. Meanwhile, the switching control module 43 controls the second switch module 42 to maintain the connection. In addition, the first controlling state can also be a state in which the external power port 20 is connected to the power supply terminal 3 normally, and the computer system 2 is on. Therefore, under the first controlling state, the computer system 2 outputs the control signal C so as to output a high level signal. The external power port 20 still inputs the external power signal P1 with 19.5 volts; therefore, the switching control module 43 controls the second switch module 42 to maintain the connection as shown in FIG. 1A.

A second controlling state is a state in which the external power port 20 and the power supply terminal 3 are disconnected such that the computer system 2 executes the backup procedure. Therefore, under the second controlling state, the computer system 2 outputs a high level signal, but the external power port 20 does not input the external power signal P1, such that the switching control module 43 still controls the second switch module 42 to maintain the connection to enable the computer system 2 to connect to the battery module 32 continuously as shown in FIG. 2.

Finally, a third controlling state is a state in which the external power port 20 is not connected to the power supply terminal 3, and the computer system 2 is shut down after the backup procedure is executed. Therefore, under the third controlling state, the computer system 2 outputs a low level signal and the external power port 20 does not input the external power signal P1. As a result, the switching control module 43 controls the second switch module 42 to electrically disconnect the connection between the computer system 2 and the battery module 32 as shown in FIG. 3.

As a result, the power control system 1 of the present invention comprises four states as abovementioned to reduce the power consumption of the battery module 32 by hardware control. Without the power control system 1 of the present invention, the battery module 32 would output 96.93 mA current, which would consume 1.196 watts of power. Therefore, the power of a battery module 32 with a normal capacity would be exhausted in one day. However, the power control system 1 of the present invention enables the battery module 32 to output 3.8 mA current, which consumes only 0.048 watts of power. Therefore, a battery module 32 of the present invention with a normal capacity would have a power consumption period of one month. As a result, the uninterruptible power system 10 of the present invention is able to reduce the power consumption of the battery module 32 effectively without the controlling of complex software.

As described above, the objectives, means, and effectiveness of the present invention are different from the characteristics of the prior art. It would be appreciated if the patent application could be issued as early as possible to benefit society. It should be also noted that the embodiments described above are for illustrative purposes; the disclosed claims of the present invention should be within the range of the accompanying claims and should not be limited to the embodiments described above.

What is claimed is:

1. An uninterruptible power system which is connected to a power supply terminal for providing power to a computer system, the uninterruptible power system comprising:

an external power port electrically connected to the power supply terminal for receiving an external power signal;

a charging module electrically connected to the external power port for receiving the external power signal from the external power port;

a battery module used for providing a backup power signal and electrically connected to the charging module, wherein the charging module is used for charging the battery module when receiving the external power signal;

a first switch module electrically connected to the external power port, the battery module, and the computer system, wherein when the external power signal is input, the external power signal is transmitted from the external power port to the computer system via the first switch module; when the external power signal is not input, the first switch module switches automatically to enable the battery module to be electrically connected to the computer system for providing the backup power signal to the computer system;

a second switch module electrically connected to the computer system and connected to the external power port or the battery module via the first switch module; and a switching control module electrically connected to the external power port, the computer system, and the second switch module, wherein when the external power signal is not input and a control signal is not received from the computer system, the switching control module controls the second switch module to electrically disconnect a connection between the computer system and the battery module, wherein the switching control module comprises:

a first transistor electrically connected to the computer system, wherein when the control signal is received from the computer system, the first transistor generates a first confirmation signal; and a second transistor electrically connected to the external power port, wherein when the external power signal is received from the external power port, the second transistor generates a second confirmation signal, wherein the second switch module is electrically connected to the first transistor and the second transistor; if the second switch module does not receive the first confirmation signal from the first transistor and does not receive the second confirmation signal from the second transistor, the second switch module electrically disconnects the connection between the computer system and the battery module.

2. The uninterruptible power system as claimed in claim 1, wherein the switching control module receives the control signal from the computer system when the computer system is on.

3. The uninterruptible power system as claimed in claim 1, wherein when the external power signal is not input to the computer system and the computer system is executing a backup procedure, the switching control module receives the control signal from the computer system.

4. The uninterruptible power system as claimed in claim 1, wherein when the external power signal is input, the switching control module controls the second switch module to maintain the connection between the computer system and the battery module.

5. The uninterruptible power system as claimed in claim 1, wherein when the external power signal is not input but the control signal is received from the computer system, the switching control module controls the second switch module to maintain the connection between the computer system and the battery module.

6. The uninterruptible power system as claimed in claim 1, wherein the second switch module is a P-type metal-oxide-semiconductor field-effect transistor.

7. A power control system which is connected to a power supply terminal, comprising:

a computer system; and an uninterruptible power system electrically connected and providing power to the computer system, the uninterruptible power system comprising:

an external power port electrically connected to the power supply terminal for receiving an external power signal;

a charging module electrically connected to the external power port for receiving the external power signal from the external power port;

a battery module used for providing a backup power signal and electrically connected to the charging module, wherein the charging module charges the battery module when receiving the external power signal;

a first switch module electrically connected to the external power port, the battery module, and the computer system, wherein when the external power signal is input, the external power signal is transmitted from the external power port to the computer system via the first switch module; when the external power signal is not input, the first switch module switches automatically to enable the battery module to be electrically connected to the computer system for providing the backup power signal to the computer system;

a second switch module electrically connected to the computer system and connected to the external power port or the battery module via the first switch module; and a switching control module electrically connected to the external power the computer system, and the second switch module, wherein when the external power signal is not input and a control signal is not received from the computer system, the switching control module controls the second switch module to electrically disconnect a connection between the computer system and the battery module, wherein the switching control module comprises:

a first transistor electrically connected to the computer system, wherein when the control signal is received from the computer system, the first transistor generates a first confirmation signal; and a second transistor electrically connected to the external power port, wherein when the external power signal is received from the external power port, the second transistor generates a second confirmation signal, wherein the second switch module is electrically connected to the first transistor and the second transistor, if the second switch module does not receive the first confirmation signal from the first transistor and does not receive the second confirmation signal from the second transistor, the second switch module electrically disconnects the connection between the computer system and the battery module.

8. The power control system as claimed in claim 7, wherein the computer system generates the control signal to the switching control module when the computer system is on.

9. The power control system as claimed in claim 7, wherein when the external power signal is not input to the computer system, the computer system executes a backup procedure to output the control signal to the switching control module.

10. The power control system as claimed in claim 7, wherein when the external power signal is input, the switching control module controls the second switch module to maintain connection.

11. The power control system as claimed in claim 7, wherein when the external power signal is not input but the control signal is received from the computer system, the switching control module controls the second switch module to maintain the connection between the computer system and the battery module.

12. The power control system as claimed in claim 7, wherein the second switch module is a P-type metal-oxide-semiconductor field-effect transistor.

* * * * *